Patented July 22, 1930

1,771,033

UNITED STATES PATENT OFFICE

CARLETON ELLIS, OF MONTCLAIR, NEW JERSEY

FURFURAL RESIN COMPOSITION AND PROCESS OF MAKING SAME

No Drawing.   Application filed January 18, 1924. Serial No. 687,017.

1. This invention relates to synthetic resins and to the process of making same and especially to a resinous body or composition comprising the products of reaction of furfural and a phenol capable of resinifying therewith and in its more specific aspects the invention relates to products which are capable of hardening or curing when heated and which may be used in the plastic industry, for example, in making molding compositions and in the production of laminated pressboard and the like. In appropriate solvents the resinous material in some forms may be used for making varnish, lacquers, baked enamels, paints and similar coating compositions.

2. A soluble fusible resin may be prepared with some difficulty from furfural and phenol by having present a great excess of phenol and subsequently expelling the latter. This treatment is costly and cumbersome and a good yield of an uniform product is not always obtainable.

3. In the present invention a base is used in lieu of an acid to bring about reaction and resinification. Preferably a fixed alkali, such as sodium or potassium carbonate or the corresponding hydroxides, is used for this purpose. In addition barium oxide or hydroxide, calcium oxide or hydroxide and mixed alkaline substances such as soda lime may be used. Volatile alkalies such as ammonia are not recommended for the preparation of a fusible resin, either soluble or insoluble. The presence of ammonia is liable to cause blisters in hot molded articles and baked coatings. Even when hexamethylenetetramine is added to the resin in making a type of molding composition which will be subsequently described, the amount of hexamethylenetetramine should be kept at the lowest proportion possible owing to the liberation of ammonia and consequent tendency to form blisters when hot pressing.

The invention therefore does not contemplate bringing about resinification between phenol and furfural through the agency of ammonia or through the use of furfuramide in place of ammonia. Methylamine and similar volatile amines are not recommended for the purpose. The invention contemplates the use of a fixed alkali or alkaline earth or similar compound.

4. A soluble fusible resin is readily formed simply by heating phenol and furfural with a few per cent of sodium carbonate. This operation can be performed under a reflux condenser at atmospheric pressure. Under these circumstances the temperature may conveniently range from 135° to 155° C. This temperature is chosen as being well-suited to expel all water from the reacting mass as the presence of moisture in the end product is undesirable. The time of heating may range from two to five hours. Higher temperatures and larger proportions of the base tend to accelerate the speed of reaction. Longer heating tends to yield a harder product or one which may become only slightly soluble and only difficultly fusible. If desired the operation may be carried out under pressure but this usually is not necessary nor desirable. More expensive apparatus is required. However when heating under pressure to a relatively high temperature the percentage of alkali added may be reduced or even eliminated entirely.

5. In addition to ordinary phenol the invention contemplates the employment of cresol or cresylic acid, also the phenolic mixture well-known in commerce under the name of "tar acids", also the various individual cresols, namely ortho, meta and paracresol or special mixtures of these. The meta and paracresol are preferred. In general I embrace by the term "phenol" all phenols capable of resinifying in this manner. Also I may carry out similar reactions with naphthols and various distillates of wood tar creosote.

It should be stated at this point that when phenol is mentioned I have in mind all those substances which are to some extent equivalent for the purposes of this invention. In mentioning illustrative equivalents in the present invention I do not wish the inference to be drawn that these are necessarily equivalents in other resinifying reactions involving raw materials otherwise foreign to this invention or employed in a totally different manner. The higher phenols are usually somewhat slower than carbolic acid, in this process.

6. For the purpose of obtaining a soluble fusible resin in carrying out the reaction with a fixed alkali the proportion of phenol to furfural is of importance. I prefer to use a slightly smaller amount by weight of furfural than phenol, say three parts of the former to four parts of the latter (i. e. about 3 mols. of furfural to 4 mols. of phenol); preferably heating for a time sufficient to bring about a fairly complete union of these substances but preferably arresting the heating at that point. Although it is possible to use equal parts of furfural and phenol or even a major proportion of the furfural it should be noted that on prolonged heating especially with strong alkalies, undesirable infusible products may be obtained which cannot be used in that form in the plastic industry. If a major proportion of furfural is to be used for any reason it is recommended to avoid protracted heating. Distillation with steam may be used to remove any excess of furfural and phenol but since this adds another step to the operation it is better to avoid steam distillation if possible and to start with proportions of phenol and furfural which unite without leaving any objectionable excess of either constituent thus simplifying the process of manufacture.

7. *Example I.*—Mix 10 pounds phenol, 7½ pounds furfural and ½ to 1 pound of powdered sodium or potassium carbonate, heat under a reflux condenser at 135–155° C. for 2 or 3 hours. A fusible soluble resin is formed. To remove any residual phenol or furfural I may, if desired, heat to 160–170° C. and blow with steam for 3 hours which deodorizes the product. At the deodorzing temperature the resin at first is fairly liquid but during said treatment becomes more viscous. On cooling a resin hard enough to be ground to a powder is obtained. On standing for a few days the particles may be found sticking together slightly. This resin is of a dark brown color, is fusible and is soluble in alcohol.

8. As an illustration of the manner of preparation of a molding composition from the resin obtained according to Example I the following is presented.

*Example II.*—In denatured alcohol dissolve 100 parts by weight of the resin prepared as above. Add 3 to 10 parts of hexamethylenetetramine and incorporate with 100 parts of ground wood or wood flour. Use enough alcohol to impregnate the filler thoroughly.

Mold at 160–180° C. for 5 to 10 minutes in a hydraulic press at a pressure per square inch of say 1000 to 2000 pounds.

In the above, I have referred to 3 parts by weight of furfural to 4 parts by weight of phenol as being approximately equal to 3:4 mols. It will be understood that such expressions as "about 3:4 mols." obviously indicate that a moderate variation from the exact molar ratio is intended to be covered.

Instead of using solutions of the resin in making the molding composition a mixture of resin and filler may be produced in other ways for example by working these ingredients on milling rolls or adding the hot molten resin to a filler in a powerful mixing machine which is steam-jacketed. Thus an ordinary Werner-Pfleiderer mixer suitably heated may be used for the purpose. The latter treatment tends to coat but not impregnate any porous filler which may be employed and is economical of resin. The various fillers customarily used in the rubber and plastic molding industry may be employed in the present case.

The proportion of filler depends on its density. For example equal parts of wood flour and resin may be used or in some cases 60 parts of resin to 40 parts by weight of this filler. Heavy fillers such as mineral powders, asbestos and the like may be used in larger proportion.

9. The resin prepared according to Example I may be neutralized to remove alkalinity and may be washed or otherwise treated to eliminate soluble salts. On the other hand a rapidly curing composition is made by adding caustic soda or caustic potash to the mix.

*Example III.*—Resin as per Example I (containing potassium carbonate) 75 parts, hexamethylenetetramine 7.5 parts, nigrosine 1.5 parts, caustic potash 1.5 parts, denatured alcohol 75 parts. Add this mixture to 75 parts of wood flour, mix thoroughly and dry in a vacuum dryer 4 hours at 28 inches vacuum gauge. Grind in a ball mill.

Molding tests of a composition prepared according to the foregoing conducted at 350° F. (177° C.) and 1000 pounds pressure gave a satisfactory cure in 5 minutes.

10. A substantially insoluble and infusible resin may be obtained by employing a larger amount of furfural and longer heating.

*Example IV.*—Add 2½ pounds of furfural to a batch of resin in the quantity obtained according to Example I. Heat for 4 hours at 150° C. A substantially infusible or heat-resistant resin results.

11. Solutions of resin and a small amount of hexamethylenetetramine for example 3 to 5 per cent or not to exceed 10 per cent of the weight of the resin may be used for impregnating sheets of paper from which laminated pressboard may be made. Solutions of the resin and hexamethylenetetramine may be employed as varnishes. Resins made in this manner are generally dark colored and cannot be used for coatings requiring light tones. Molded products also may be made by cold molding methods. In this case mineral fillers such as asbestos, clay and the like are preferably employed, and hexamethylenetetramine is not desirable.

In recapitulation the present invention is concerned with the resinous products (or compositions containing such products) formed by the action of furfural on a phenol capable of resinifying therewith in the presence of an alkali such as sodium and potassium hydroxide, carbonate and bicarbonate, barium and calcium oxide and hydroxide or other appropriate basic material of a fixed or non-volatile character (hereinafter referred to as "fixed alkali"); the proportion of the phenol preferably being a little greater than the furfural, the resin preferably being formed at a temperature substantially above the expulsion point of any water formed for example between 135° and 155° C. and preferably maintaining such heat treatment to secure a very substantial degree of resinification of the reacting constituents, subsequently, if desired treating with steam preferably at a higher temperature to deodorize and harden the resin with the object of forming a resin which is fusible and preferably also soluble in various organic solvents such as acetone or ordinary alcohol (e. g. ethyl or denatured); such resin being if desired incorporated with a filler to provide a molding composition; which also may contain hexamethylenetetramine.

And the invention is further concerned with the process of making a product in the manner indicated by the foregoing.

What I claim is:—

1. The process of making a resinous material which comprises reacting on one mol. of furfural with at least one mol. of a phenol capable of resinifying therewith, in the presence of a fixed alkaline substance at a temperature substantially above the expulsion point of water, arresting the heating when the furfural and phenolic body have become largely converted into a resin and incorporating the resinous material with hexamethylenetetramine and a small amount of a fixed alkali.

2. The process of making a resinous material which comprises reacting on furfural with at least an equimolecular quantity of a phenol capable of resinifying therewith in the presence of a fixed alkaline substance at a temperature substantially above the expulsion point of water, arresting the heating when the furfural and phenolic body have become largely converted into a resin and incorporating the resinous material with hexamethylenetetramine and a caustic alkali.

3. The process of making a resinous material which comprises reacting on furfural with at least an equimolecular quantity of a phenol capable of resinifying therewith in the presence of a fixed alkaline substance at a temperature substantially above the expulsion point of water, arresting the heating when the furfural and phenolic body have become largely converted into a resin, heating to a higher temperature while blowing with steam whereby the resinous material is deodorized and incorporating with hexamethylenetetramine.

4. The process of making resinous material which comprises heating a reactive phenolic body, in the presence of a fixed alkali, with a resinifying agent comprising furfural in such proportions as to produce a fusible resin and incorporating hexamethylenetetramine and a small amount of fixed alkali with the resulting fusible resinous product.

CARLETON ELLIS.